Aug. 13, 1963   L. MÜLLER   3,100,382
COUPLER FOR COUPLING A PILE MEMBER TO A PILE DRIVER
Filed March 23, 1960   5 Sheets-Sheet 1
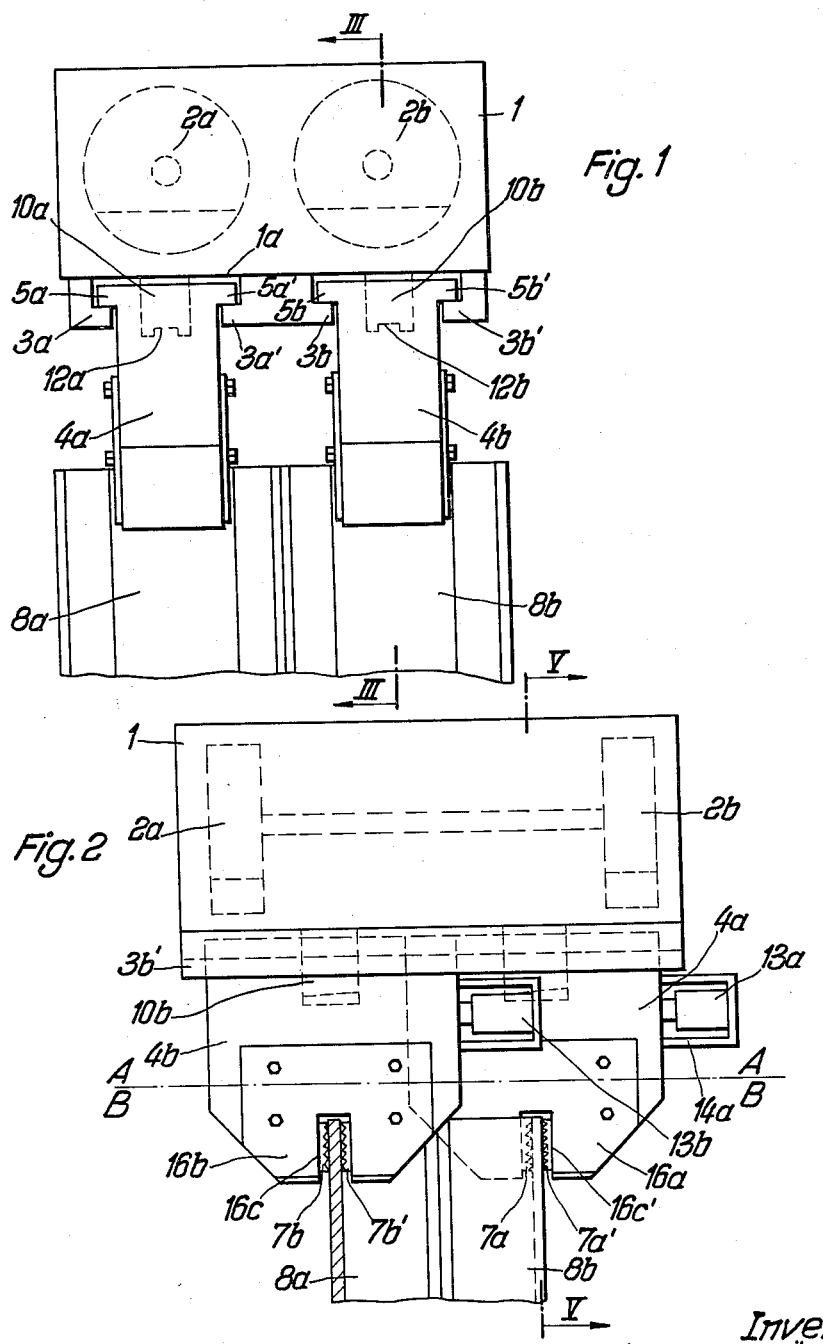
Inventor:
LUDWIG MÜLLER
By Hane and Nydick
ATTORNEYS Inventor:
LUDWIG MÜLLER
By Hane and Nylich
ATTORNEYS

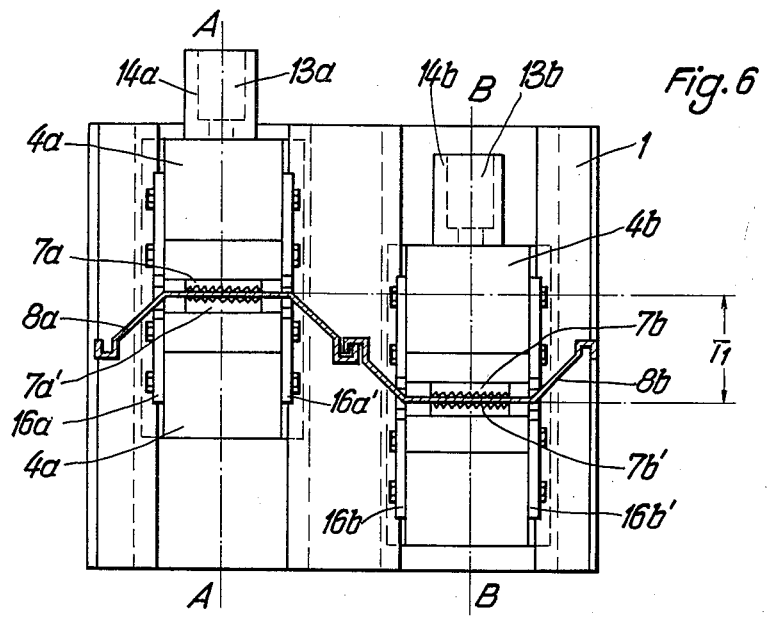
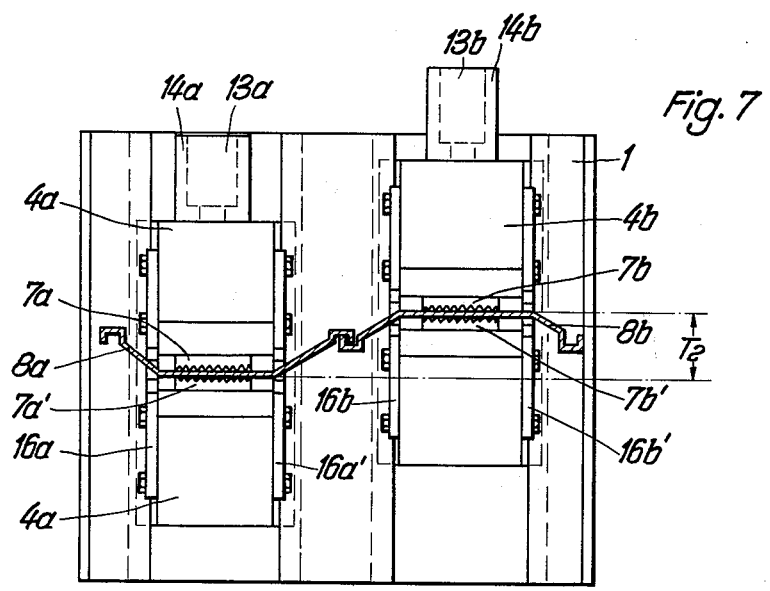

United States Patent Office 3,100,382
Patented Aug. 13, 1963

3,100,382
COUPLER FOR COUPLING A PILE MEMBER TO A PILE DRIVER
Ludwig Müller, Heinrich-Heine-Strasse 41, Marburg (Lahn), Germany
Filed Mar. 23, 1960, Ser. No. 17,087
Claims priority, application Germany Mar. 26, 1959
9 Claims. (Cl. 61—53.5)

The present invention relates to machinery for driving and lifting respectively pile members such as sheet piles, pile shafts and other members to be driven into the ground by means of an oscillating generator such as a reciprocating driving or ramming device, and more particularly to devices for releasably coupling the sheet pile or other member to be driven or lifted with the driving device.

It is desirable for an economic and efficient operation that coupling devices of the general kind above referred to, can be rapidly and safely coupled and also rapidly released.

Accordingly, it is a broad object of the invention to provide a novel and improved coupling device of the general kind above referred to, by means of which the member to be driven or lifted can be safely and more rapidly connected to the driving device and disconnected therefrom than was heretofore possible.

A more specific object of the invention is to provide a novel and improved coupling device which affords the advantage that several members to be driven or lifted, such as two sheet piles interlocked with their flanges can be simultaneously connected to the driving device for joint driving or lifting.

Another more specific object of the invention is to provide a novel and improved coupling device which can be conveniently adjusted to accommodate the specific profiles of the members to be driven or lifted.

Other and further objects, features and advantages of the invention will be pointed out hereinafter and set forth in the appended claims.

Broadly, the invention resides in providing a coupling device for the purpose aforesaid which comprises support means adjustably supported on the driving means and including coacting clamping jaws which are movable into and out of a clamping position. The coupling device further comprises actuating means by means of which the jaws are clamped to the member or members to be lifted and released therefrom and moved into pressure engagement with the support means and the support means, in turn, are moved into force transmitting engagement with the driving means.

In the accompanying drawing a preferred embodiment of the invention is shown by way of illustration and not by way of limitation.

In the drawing:

FIG. 1 is an elevational front view of a coupling device according to the invention supported by an oscillation generator such as a reciprocatory driving device and supporting in turn two sheet piles.

FIG. 2 is an elevational side view of FIG. 1.

FIG. 6 is a bottom view of FIG. 1, and

FIG. 7 is a bottom view similar to FIG. 6, but showing the coupling device adjusted for pile profiles different from those of FIG. 6.

Figure 3:
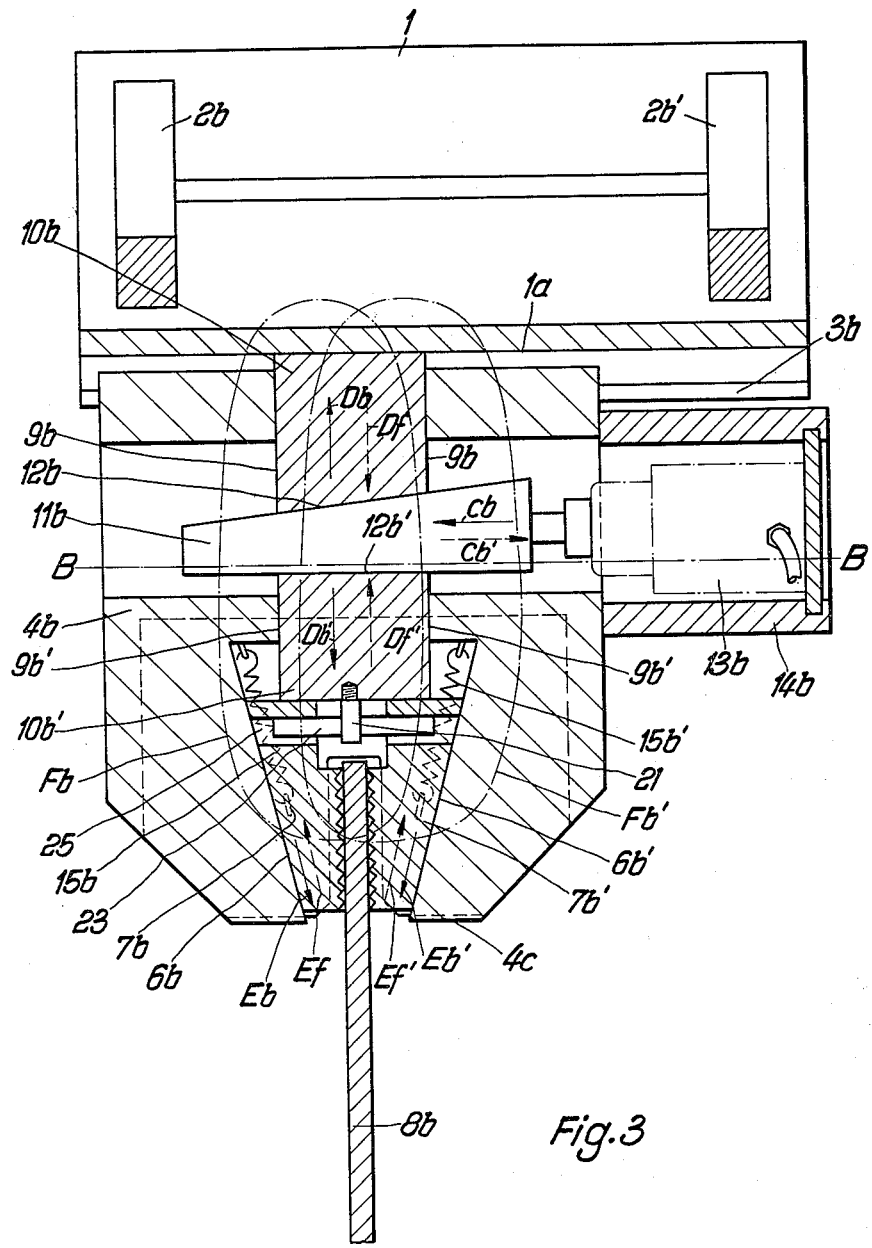
FIG. 3 is a section taken on line III—III of FIG. 1 on an enlarged scale.

Referring now to the figures in detail, the figures show an oscillation generator including pairs of vibratory or oscillatory masses 2a, 2a' and 2b, 2b' and a mounting member 1. The generator should be visualized as being of conventional design and the structure of the generator as such does not constitute part of the invention. The frame structure of the generator comprises mounting means in the form of guide tracks 3a, 3a' and 3b, 3b'. Two pairs of tracks are shown, but it should be understood that only one pair of tracks may be provided or more than two pairs, depending upon the number of members to be driven or lifted.

The coupling device according to the invention, being designed for clamping two pile sheets, comprises two supports 4a and 4b. The supports are slidably suspended in the tracks by means of guide flanges 5a, 5a' and 5b, 5b'. The two supports can be adjusted in reference to each other by sliding the supports in the respective tracks. As is evident, the supports are slidable according to FIG. 1 in the direction perpendicular of the plane of the paper and according to FIG. 2 in the direction parallel to the plane of the paper. The sliding directions of the supports are indicated by the letters A and B in the figures. Sliding of the supports relative to each other permits adjustment of the coupling device for different depths of the profile of the pile sheets as is evident from a comparison of FIGS. 6 and 7. The two supports are alike and all the components of one support are indexed with the letter $a$ and all the corresponding components of the other support are indexed with the letter $b$. For the sake of convenience, reference is generally made to one support only, but it should be understood that the description applies to the other support also.

Each support is formed with internal downwardly tapered guide surfaces $6b$, $6b'$ to define a space within which a pair of clamping jaws $7b$ and $7b'$ is fitted. The inner surfaces of the two jaws facing each other serve to receive a member to be lifted such as a pile sheet $8b$ therebetween to clamp the pile sheet with a frictional grip. To increase the gripping force exerted by the jaws, the inner surfaces thereof are preferably provided with teeth $4a$, or be given an otherwise increased friction coefficient. The outer surfaces of the two jaws are in slidable engagement with guide surfaces $6b$ and $6b'$.

The clamping jaws are actuated by an actuating means which comprises a pair of pressure members $10b$ and $10b'$ which are slidably guided toward and away from each other in guide grooves $9b$ and $9b'$ formed in the support $4b$. The actuating means further comprises a wedge $11b$ extending between the two pressure members $10b$ and $10b'$. The wedge is guided in grooves $12b$ and $12b'$ formed in the pressure members. The wedge can be displaced in the direction of arrows $Cb$ and $Cb'$ respectively by suitable drive means, preferably power drive means $13b$ such as a hydraulic press. The power drive means is mounted in a frame $14b$ fixedly secured to support $4b$.

As is evident, displacement of wedge $11b$ in the direction $Cb$ will cause movement of the pressure members in the direction $Db$ and $Db'$ respectively. The displacement of pressure member $10b'$ is transmitted to the clamping jaws by means of a member 21 secured to member $10b'$ and from which extend lateral arms 23. These arms engage into recesses or bores 25 formed in the clamping jaws.

As is now evident, displacement of the wedge will result in corresponding uniform displacements of both pressure members and both clamping jaws.

Let it now be assumed that two pile sheets $8a$ and $8b$ are to be clamped to the generator by means of the coupling device. To this end, each wedge is displaced in the direction $Cb$ resulting in a corresponding displacement of the pressure members in the directions $Db$ and Db' and of the clamping jaws in the directions Eb and Eb' until the clamping jaws are pressed on one side against the pile sheets and on the other side against the support and the pressure members abut against the bottom surface 1a of generator 1. As a result, two closed paths of force Fb and Fb' are formed which are indicated in FIG. 3 by dotted lines, or in other words, all the described engaging or supporting surfaces involved are now tightly pressed against each other.

Figure 4:
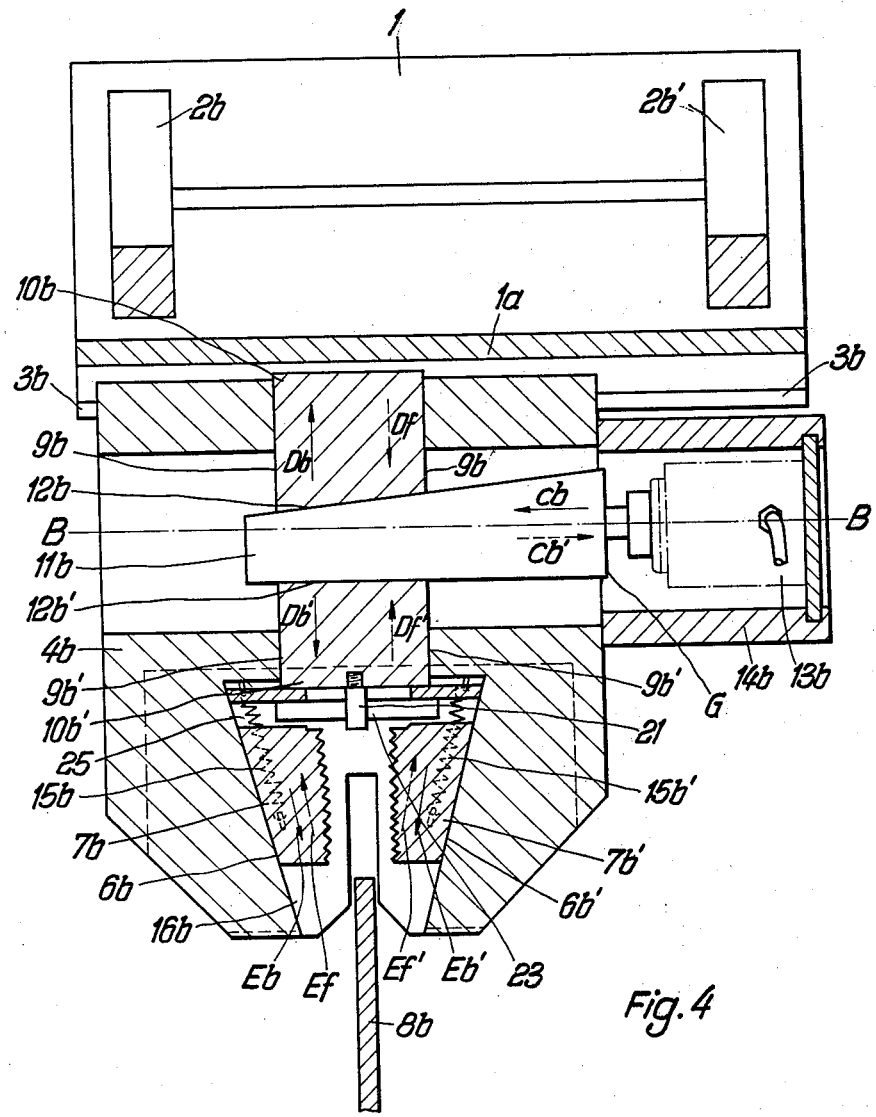
FIG. 4 is an elevational sectional view of the coupling device on an enlarged scale, the clamping jaws being shown in the release position.
Figure 5:
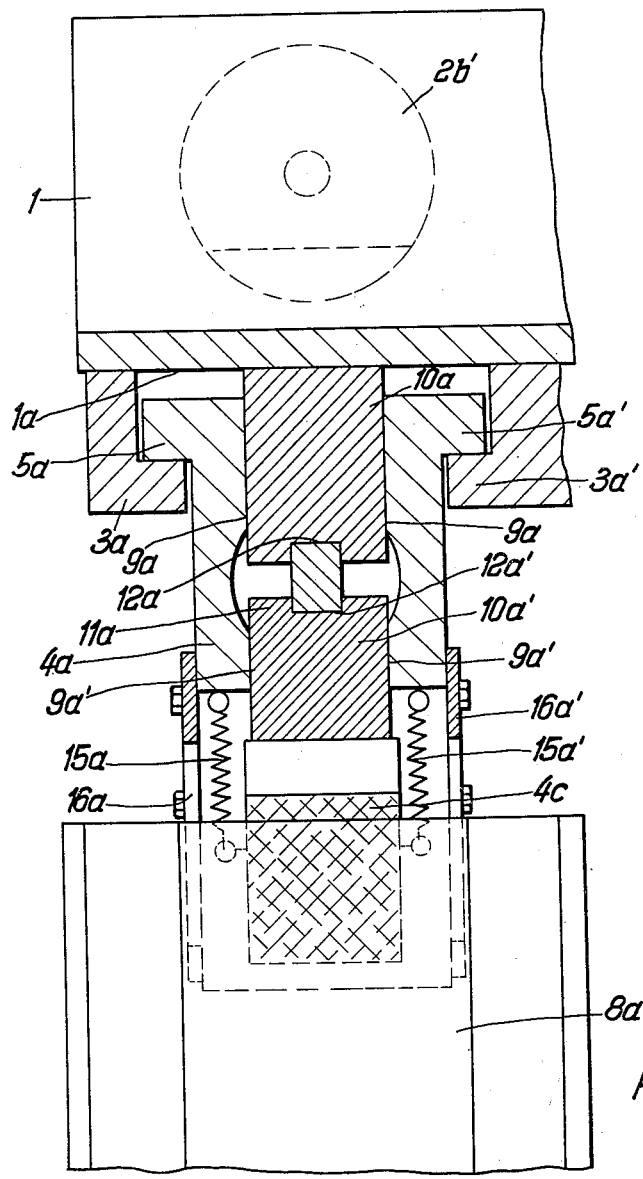
FIG. 5 is a section taken on line V—V of FIG. 2 on an enlarged scale.

In order to release the clamped pile sheets, the wedge 11b is displaced in the direction Cb' until it occupies the position G shown in FIG. 4.

Loaded springs 15b and 15' are provided which on one end are secured to the clamping jaws and on the other end to support 4b. The springs tend to pull the clamping jaws from the clamping position of FIGURE 3 toward the release position of FIG. 4 as the wedge is withdrawn.

Guide sheets 16b' secured to the supports and formed with guide slots 16c and 16c' are provided to facilitate insertion of the sheet piles or other members to be driven or lifted into the coupling device.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A driving device for driving and lifting respectively a pile member, said driving device comprising an oscillatory driving means for applying a longitudinally directed force to said pile member, and a releasable coupling device including a support means movable into and out of pressure engagement with the driving means for transmission of the oscillations thereof to the support means, a pair of coacting clamping jaws mounted on said support means and displaceable relative to each other and to the support means between a clamping position clamping said pile member and a release position releasing said pile member, spring means biasing the clamping jaws toward the release position, and an actuating means extending between said jaws and said support means movable in reference to the jaws and the support means and being operable for simultaneously moving said jaws into and out of clamping engagement with the pile member, into and out of pressure engagement with the support means and said support means into and out of pressure engagement with said driving means.

2. A coupling device according to claim 1 and comprising spring means secured to said support means and said clamping jaws, said spring means being loaded by the movement of the jaws into the clamping position and urging the clamping jaws toward the release position.

3. A coupling device according to claim 1 and comprising slotted guide means secured to said support means for guiding the pile member between said clamping jaws.

4. A driving device for respectively driving and lifting several pile members, said driving device comprising an oscillatory driving means for applying a longitudinally directed force to said pile members, said driving means including a mounting means participating in oscillations of said driving means and having guide surfaces extending at an angle to the direction of said force, several support means slidable on said guide surfaces parallel to each other for adjusting the position of the support means in reference to each other, a pair of coacting clamping jaws mounted on each of said support means slidable relative to each other and the respective support means between a clamping position clamping the respective pile member and a release position releasing the respective pile member, and an actuating means for each of said support means, each of said actuating means extending between the respective jaws and the respective support means movable relative to the jaws and the support means and being operable for simultaneously moving said jaws into and out of clamping engagement with the respective pile member and into and out of pressure engagement with the respective support means and said support means into and out of oscillation transmitting engagement with said mounting means of the driving means.

5. A driving device according to claim 4 wherein each of said actuating means comprises pressure means disposed between the support means and the jaws and movable between an operative position effecting said clamping engagement and said pressure engagement and a release position, a displaceable wedge assembly engaging said pressure means for controlling the position thereof, and drive means operatively connected with said wedge assembly for displacing the same.

6. A driving device according to claim 5 wherein each of said pressure means comprises several pressure members mounted slidably toward and away from each other to move said pressure members into the operative and release position respectively, and wherein said wedge assembly comprises a wedge slidably disposed between said pressure members to control the position thereof relative to each other by the position of the wedge in reference to the pressure members.

7. A driving device according to claim 6 wherein said pressure members have guide grooves engaged by said wedge.

8. A driving device according to claim 6 wherein each of said pressure means further comprises coupling elements extending into recesses of said clamping jaws to effect displacement of the latter.

9. A driving device for simultaneously driving several pile members, said driving device comprising an oscillatory driving means for applying longitudinally directed intermittent forces to said pile members, said driving means including a mounting means participating in oscillations of said driving means and having guide surfaces extending transverse of the direction of said forces, several support means slidably supported on said guide surfaces suspended therefrom for adjusting the lateral spacing of the support members, a pair of coacting clamping jaws mounted on each of said support means slidable relative to each other and the support means between a clamping position in clamping the respective pile members and a release position releasing the same, and actuating means for each of said support means, each of said actuating means including a pair of pressure means disposed between said driving means and the respective jaws and displaceable toward and away from each other between an operative position engaging said jaws to move the same into said clamping position and pressing against said driving means to press the guide surfaces thereof against said support means and a release position releasing said jaws and said pressure at the driving means and the guide surfaces, a displaceable wedge assembly extending between said pressure means to control the position thereof in reference to each other, and drive means drivingly coupled with said wedge assembly for displacing the same.

References Cited in the file of this patent

UNITED STATES PATENTS

| | | |
|---|---|---|
| 1,221,400 | Wilhelm et al. | Apr. 3, 1917 |
| 1,466,916 | Pearl | Sept. 4, 1923 |
| 1,469,360 | Cullen | Oct. 2, 1923 |
| 1,564,956 | Hansen | Dec. 8, 1925 |
| 2,347,922 | Nelson | May 2, 1944 |
| 2,384,636 | Nelson | Sept. 11, 1945 |